(12) United States Patent
Hershey

(10) Patent No.: US 10,295,261 B2
(45) Date of Patent: May 21, 2019

(54) REFRACTORY LINING REPAIR MATERIAL

(71) Applicant: VESUVIUS CRUCIBLE COMPANY, Wilmington, DE (US)

(72) Inventor: Ryan Hershey, Burgoon, OH (US)

(73) Assignee: VESUVIUS U S A CORPORATION, Champaign, IL (US)

( * ) Notice: Subject to any disclaimer, the term of this patent is extended or adjusted under 35 U.S.C. 154(b) by 139 days.

(21) Appl. No.: 15/121,175

(22) PCT Filed: Jan. 21, 2015

(86) PCT No.: PCT/US2015/012204
§ 371 (c)(1),
(2) Date: Aug. 24, 2016

(87) PCT Pub. No.: WO2015/142417
PCT Pub. Date: Sep. 24, 2015

(65) Prior Publication Data
US 2017/0030647 A1    Feb. 2, 2017

Related U.S. Application Data

(60) Provisional application No. 61/968,423, filed on Mar. 21, 2014.

(51) Int. Cl.
| | | |
|---|---|---|
| *F27D 1/16* | (2006.01) | |
| *F27D 1/00* | (2006.01) | |
| *C04B 14/30* | (2006.01) | |
| *C04B 14/32* | (2006.01) | |
| *C04B 18/14* | (2006.01) | |
| *C04B 24/30* | (2006.01) | |
| *C04B 28/06* | (2006.01) | |
| *C04B 111/28* | (2006.01) | |

(52) U.S. Cl.
CPC .......... *F27D 1/1636* (2013.01); *C04B 14/303* (2013.01); *C04B 14/305* (2013.01); *C04B 14/324* (2013.01); *C04B 18/146* (2013.01); *C04B 24/302* (2013.01); *C04B 28/06* (2013.01); *F27D 1/0043* (2013.01); *C04B 2111/28* (2013.01); *F27D 2001/0046* (2013.01)

(58) Field of Classification Search
CPC ..... F27D 1/1636; C04B 28/06; C04B 14/303; C04B 14/324; C04B 14/305
USPC ....................................................... 523/141
See application file for complete search history.

(56) References Cited

U.S. PATENT DOCUMENTS

| | | | |
|---|---|---|---|
| 4,339,405 A | 7/1982 | Panzer | |
| 4,800,181 A * | 1/1989 | Lassiter | ................. C04B 35/18 501/128 |
| 4,939,188 A | 7/1990 | Gerber | |
| 4,943,544 A * | 7/1990 | McGarry | ........... C04B 20/0076 106/638 |
| 5,686,506 A * | 11/1997 | Gerber | ................... C04B 35/03 523/139 |
| 5,945,168 A * | 8/1999 | Bogan | .................... C04B 28/06 427/426 |
| 6,046,252 A | 4/2000 | Gerber | |
| 6,315,492 B1 | 11/2001 | McIntosh | |
| 7,503,974 B2 | 3/2009 | Mintz et al. | |
| 8,563,083 B2 | 10/2013 | McGowan et al. | |
| 2002/0182406 A1 * | 12/2002 | Rieder | ................... C04B 16/06 428/364 |
| 2014/0023781 A1 | 1/2014 | McGowan | |

FOREIGN PATENT DOCUMENTS

| | | | |
|---|---|---|---|
| CA | 2515337 | | 8/2004 |
| CN | 1075471 | | 8/1993 |
| CN | 1093069 | | 10/1994 |
| CN | 1544552 | | 11/2004 |
| CN | 1761635 | | 4/2006 |
| CN | 101838122 A | | 9/2010 |
| CN | 102515630 | | 6/2012 |
| CN | 103011847 A | | 4/2013 |
| EP | 0370595 | | 5/1990 |
| EP | 0520413 | | 12/1992 |
| EP | 2565173 | | 6/2013 |
| GB | 2 347 414 | * | 9/2000 |
| JP | H06034277 A | | 2/1994 |
| JP | H09241012 A | | 9/1997 |
| JP | 2000016843 A | | 10/1998 |
| JP | H10281657 A | | 10/1998 |
| JP | 2000026169 A | | 1/2000 |
| JP | 2001048662 A | | 2/2001 |
| JP | 2003104781 A | | 9/2003 |
| JP | 2009249193 | | 10/2009 |
| WO | 2008036310 A2 | | 3/2008 |

* cited by examiner

*Primary Examiner* — Doris L Lee
(74) *Attorney, Agent, or Firm* — Thomas Clinton; Donald M. Satina

(57) ABSTRACT

A formulation containing polymer, resin and cement combined with aggregate can be used as a gunnable mix that is applied to a surface by being conveyed pneumatically in dry form to a nozzle, where water is added. Polymer in the gunnable mix enables it to adhere and bond to a surface, such as carbon brick, of a lining of a vessel used for the containment of molten metals. The formulation may be used, for example, to repair and protect blast furnace hearth linings.

17 Claims, 5 Drawing Sheets

REFRACTORY LINING REPAIR MATERIAL

BACKGROUND OF THE INVENTION (a) Field of the Invention

This invention relates to repair materials for use in vessels for the containment of molten metals. These materials find use in, for example, the repair of blast furnace hearth linings and furnace stacks.

(b) Description of the Related Art

Blast furnaces are used to process iron ore into iron and cast the resulting product from the blast furnace in a molten form. The interior surfaces of blast furnaces are lined with refractory materials to contain the molten metal. Since blast furnaces are large, complex structures and very costly to rebuild, it is economically beneficial to increase the operating life of a given blast furnace as much as possible. Increased operating life leads to an increased need for interim repairs of the furnace refractory lining. An increase in time and resources devoted to the repair process reduces the efficiency of the blast furnace. Consequently, there is a need to reduce the time required, expense and complexity of the procedure used to repair the furnace lining.

The lining of the blast furnace hearth has carbon-based (e.g., carbon brick) or graphite-based materials on the wall combined with different types of cooling systems. A carbon-based grout may be used between the cooling system and the wall. A highly conductive material, such as carbon, is needed to transfer heat from the wall to the cooling system. The lining must also exhibit low permeability, high density, high strength, and high resistance to chemical attack.

In use, the lining is subjected to extremes of temperature, and must resist the materials with which it comes into contact. Because lining wear is uneven, certain parts of the lining may need repair before the lining as a whole needs replacement. The repair of a blast furnace hearth may take place in conjunction with a shutdown for stack shotcrete repairs. This typically occurs in about 18 to 24 month intervals. Total relines are very rare in current blast furnace operation, and might take place every 20 to 30 years. A material may be projected against the carbon-based or graphite-based material lining the interior of the vessel. This bonding material must be capable of bonding with carbon-based or graphite-based material, and must have chemically-resistive and physical-resistive properties similar to those of the carbon-based or graphite-based material on which it will be supported.

The hearth lining material must resist chemical attack by lead, zinc, iron and slag at the bottom of the hearth, and must resist physical degradation resulting from extreme conditions. Hearth temperatures may range from 2500° F. to 3000° F. (1371-1648° C.). The hearth lining material must also resist mechanical attack. Mechanical erosion is produced by moving and recirculating molten iron, and by molten iron draining out of the furnace. Additionally, mechanical erosion is increased by the ferrostatic pressure due to the volume of the vessel and high density of the iron above the hearth.

Certain known hearth lining materials contain different types of refractory aggregate, calcium aluminate cement, and other materials to yield a shotcretable material. A shotcretable material is mixed with water to a consistency that can be pumped through a concrete pump, and then sprayed by injecting air and an accelerator through a nozzle, to form a monolithic lining without the need for forms.

Another known blast furnace hearth lining repair formulation has been described as acting as an "artificial skull" to protect the damaged hearth. The application procedure included cleaning the hearth pneumatically, spraying a surfactant onto the hearth wall brick, and then shotcreting the walls with a silicon carbide (SiC) containing shotcrete mix. Shotcrete mix must have a particle size distribution permitting it to be pumped by a concrete pump. This application procedure has the disadvantages inherent to shotcreting, such as requiring large and expensive equipment and involving a long setup time, the requirement of an extra step of spraying on a surfactant in order for the material to adhere to the carbon brick, and the requirement that the shotcreting mix must have a particle size distribution permitting it to be pumped by a concrete pump.

Devices for dry pneumatically gunning, such as a Reed LOVA gun, Allentown N-1 gun, Piccola gun, etc. have been used to project refractory repair materials against the interior surfaces of the blast furnace. Previously known gunning procedures utilize the standard cooling down procedure followed for a particular blast furnace for a stack job and hearth repair. The side walls of the furnace are then pneumatically cleaned and the hearth repair material is gunned onto the walls. Ramping up the furnace may be accomplished by starting at about 70° F. (21° C.), then heating the material to 350° F. (177° C.), and maintaining the furnace at 350° F. (177° C.) for 8 hours. The furnace is then ramped to 600° F. (316° C.) over a period of 4 hours. Finally, the furnace is soaked at 600° F. (316° C.) for 12 hours. At this point the furnace is ready to start back up again.

BRIEF SUMMARY OF THE INVENTION

This invention relates to a formulation for use in repairing linings of vessels used for the containment of molten metals. The formulation may be used, for example, to repair and protect blast furnace hearth linings. The formulation is a one component system that adheres to the carbon brick when the formulation is gunned onto the surface of the carbon brick located in the hearth of a blast furnace. The formulation contains refractory aggregate, cement, resin, and polymer. The application method of the formulation includes cleaning off, such as by pneumatic cleaning, the carbon brick surface to which the formulation is to adhere. The carbon brick is then dusted off. The inventive formulation is then gunned onto the carbon brick, in a single layer of material. Some anchors may be need for large vertical areas due to the volume and density of the material.

The formulations of the present invention are gunning formulations rather than shotcreting formulations. A shotcretable material is a material that is mixed with water to a consistency that can be pumped through a concrete pump, and then sprayed by injecting air and an accelerator through a nozzle, to form a monolithic lining without the need for forms. The gunnable (or gunite) mixes of the present invention are applied by being conveyed pneumatically in dry form to a nozzle, where water is added. Gunnable mixes have an advantage over shotcrete mixes in that the former do not need to have a particle size distribution that is able to be pumped by a concrete pump. A dry powder accelerator is contained within the gunnable mix to set it once applied to the wall. Accelerators can include, but are not limited to, sodium silicate, sodium aluminate, hydrated lime, and calcium chloride. In wet shotcreting, the same accelerators can be used except they are separately pumped to the nozzle and could be a dry powder or slurry liquid.

The inventive formulation creates a sticky, gunnable material after it is combined with water at the nozzle. The resulting material adheres and bonds to the carbon brick; the adhesion helps to prevent cracking and shearing of the inventive formulation from the carbon brick. This is an all-in-one material and will adhere to a surfactant-free surface. Particular embodiments of the inventive formulation adhere to carbon brick when applied at temperatures as low as 45° F. (7.2° C.).

Polymer, resin, and cement are used in the binding system for the aggregate mix of embodiments of this inventive formulation. Each component plays a role in order to properly bind the inventive formulation to the blast furnace hearth carbon brick. The polymer dissolved in water enables the inventive formulation to adhere to the carbon brick at temperatures at an initial temperature range, for example, from 59° F. to 77° F. (15° C. to 25° C.). The cement sets the material and develops its initial bonding strength at the initial temperature range. Then, the resin material starts to set at around 200° F. (93° C.). The combination of this system creates a successful material to help protect the blast furnace carbon brick.

Polymers are a type of chemical compound or mixture of compounds that consist of many repeating structures. The repeating structures are molecules with low molecular masses that are linked together by covalent chemical bonds. Polymers used in the inventive formulation are water soluble polymers that have a wide range of functionalities and benefits in a variety of applications. Polymers used in the inventive formulation are carbon based, and thus have a carbon yield that may be determined in a carbon yield test (Conradson) such as ASTM standard test D2416. Polymers that may be used in the inventive formulation may include any water soluble polymers that are available commercially, such as cellulose, dextran, Poly(N-vinylPyridine), Poly(acrylamide/acrylic acid), Poly(acrylic acid), Poly(ethylene glycol), Poly(ethylene oxide), Poly(N-vinylpyrrolidone), Poly(vinyl alcohol), Polyacrylamide, and Polyethylenimine, and combinations of these polymers. The inventive formulation is a gunning material that is sprayed onto the wall with water and pressurized air; a water soluble polymer dissolved in the formulation is able to chemically bind to the carbon brick. The polymer may constitute from and including 0.01 wt % to and including 30 wt %, from and including 0.05 wt % to and including 25 wt %, from and including 0.1 wt % to and including 20 wt % as a percentage of the total formulation batch, including liquids and solids.

Resins are thermosetting polymers. A polymer is a type of chemical compound or mixture of compounds that consist of many repeating structures. The repeating structures are molecules with low molecular masses linked together by covalent chemical bonds. Resins are able to bind and to set up with increasing temperature. Resins start to cross link at around 200° F. (93° C.) and this property provides additional low temperature strength of the inventive formulation. Resins that may be used in the present invention include but are not limited to these polymers: Phenolic Novolac Resins, Phenolic Resole Resins, Epoxy resins, Polyester resins, Epoxy-Polyester hybrid resins, polyurethane resins, polyester, acrylic and mixtures of these materials. The resin may constitute from and including 0.01 wt % to and including 30 wt %, from and including 0.03 wt % to and including 25 wt %, from and including 0.05 wt % to and including 20 wt % as a percentage of the total formulation batch, including liquids and solids.

A hydraulic cement is another component of the inventive formulation. A hydraulic cement is type of binder that sets by forming hydrated compounds when mixed with water, and is used to bind the aggregate components together. Hydraulic cements consist of various combinations of $SiO_2$, $Al_2O_3$, $Fe_2O_3$, and CaO. Some examples include, but are not limited to, these cements: Portland cements of all types, blast furnace cement, flue ash Portland Cement, Ciment Composè, Puzzolane cement, High Alumina Cement (Calcium Aluminate Cement), Brunauer cement, Grenoble cement, and Roman Cement. The cement may constitute from and including 0.01 wt % to and including 20 wt %, from and including 0.05 wt % to and including 18 wt %, from and including 0.1 wt % to and including 15 wt % as a percentage of the total formulation batch, including liquids and solids. The cement may constitute from and including 0.01 wt % to and including 15 wt % of the dry formulation, 0.01 wt % to and including 14 wt % of the dry formulation, 0.01 wt % to and including 13 wt % of the dry formulation, 0.01 wt % to and including 12 wt % of the dry formulation, 0.01 wt % to and including 11 wt % of the dry formulation, or 0.01 wt % to and including 10 wt % of the dry formulation.

Aggregate is another component of the inventive formulation. The type of aggregate used may include but is not limited to is calcined flint clay (or chamotte), calcined kaolin (such as Mulcoa® 47), calcined bauxitic kaolin (such as Mulcoa® 60 or Mulcoa® 70), andalusite, tabular Alumina, silicon carbide, silicon nitride, calcined alumina, reactive alumina, hydrated alumina, silica fume (also called fumed silica or microsilica), white fused alumina, brown fused alumina, calcined bauxite, silica sand, silica, clay, kyanite, spinel, fused silica, zircon, zirconia, and combinations thereof. Mulcoa is a trade name for a particular process of calcining kaolinite clay or bauxitic kaolinite clay that is mined from the earth, and for the resulting product. One example of the inventive mixture includes Mulcoa 60, Tabular Alumina, Silicon Carbide, calcined alumina, reactive alumina, and silica fume as the aggregates used. In some embodiments of the inventive formulation, refractory aggregates are present in the wet formulation in an amount in the range from and including 5 wt % to and including 90 wt %, from and including 8 wt % to and including 85 wt %, from and including 10 wt % to and including 80 wt %, from and including 40 wt % to and including 90 wt %, from and including 45 wt % to and including 90 wt %, from and including 50 wt % to and including 90 wt %, and from and including 55 wt % to and including 90 wt %, With respect to particle sizes, Mulcoa 60 is US −4+8 mesh (4.75 to 2.36 mm), tabular alumina is US −6 to −50 mesh (less than 3.35 mm to less than 0.3 mm), silicon carbide is US −100 mesh (less than 0.15 mm) and US −200 mesh (0.075 mm), and all other components (water soluble polymer, resin, metal, cement, alumina, and additives) are US −200 mesh (0.075 mm). This selection will allow the inventive formulation to be able to be gunnable. Various inventive formulations may contain fractions that are retained on a 9.5 mm sieve, an 8 mm sieve, a 6 mm sieve, a 5 mm sieve, a 4 mm sieve, a 3 mm sieve, or a 2 mm sieve.

The inventive formulation may further include metal containing substances. The metal containing components that may be used include, but are not limited to, aluminum, silicon, ferrosilicon, ferrosilicon nitride, titanium dioxide, and combinations thereof. In certain embodiments of the invention, the metal compound is present in the wet formulation in an amount in the range from and including 0.01 wt % to and including 10 wt %, from and including 0.015 wt % to and including 9 wt %, from and including 0.02 wt % to and including 8 wt %.

This invention may incorporate a dispersant that may include, but is not limited to, pulverized sodium polyphosphate glasses (sodium hexametaphosphates), other sodium phosphates, organic dispersants such as naphthalene sulfonate salts, sodium lignosulfonates. In certain embodiments of the invention, sodium polyphosphate glass is present in the formulation in an amount in the range from and including 0.01 wt % to and including 5 wt %, from and including 0.015 wt % to and including 4.5 wt %, from and including 0.02 wt % to and including 4 wt %.

The inventive formulation may contain a dry powder accelerator for the cement. An example of such an accelerator is hydrated lime ($Ca(OH)_2$), but many other compounds known to accelerate cements, such as magnesium oxide (MgO), magnesium hydroxide and lithium compounds may also be used. In certain embodiments of the invention, hydrated lime is present in the formulation in an amount in the range from and including 0.01 wt % to and including 5 wt %, from and including 0.015 wt % to and including 4.5 wt %, from and including 0.02 wt % to and including 4 wt %.

The inventive formulation may contain polymer fibers such as polyolefin, polyethylene (PE), polypropylene (PP), and a combination of both PE and PP. These fibers are used to help create open porosity into the mix during the drying cycle to aid in the drying process. In certain embodiments of the invention, the polymer fibers are present in the wet formulation in an amount in the range from and including 0.01 wt % to and including 5 wt %, from and including 0.015 wt % to and including 4.5 wt %, or from and including 0.02 wt % to and including 4 wt %.

Dry, pneumatically conveyed, gunnable mixes offer, when compared to wet pumped shotcrete mixes, easy start up, shut down, and clean up. No water is required for cleanup of gunnable mixes. When gunnable mixes are used, the nozzle can be up to 1000 feet (300 meters) horizontally or 500 feet (150 meters) vertically from the gun. Dry gunnable mixes are ideal for small installations, of about 10 to 15 tons (9000 kg to 14000 kg). Dry gunnable mix application equipment is lower in cost and has lower maintenance requirements than shotcrete mixers and pumps and is readily available in most markets. Shotcreting material is transported in wet form, whereas dry gunning material is propelled by air; therefore, careful control of particle sizing and set time is less critical for gunnable mixes than for shotcreting.

Cast or gunned materials produced by the inventive formulation may possess densities greater than 122 pounds per cubic foot (1.95 grams per cubic centimeter), 125 pounds per cubic foot (2.00 grams per cubic centimeter), 130 pounds per cubic foot (2.08 grams per cubic centimeter), greater than 135 pounds per cubic foot (2.16 grams per cubic centimeter), greater than 140 pounds per cubic foot (2.24 grams per cubic centimeter), or greater than 145 pounds per cubic foot (2.32 grams per cubic centimeter). Cast or gunned materials produced by the inventive formulation may possess porosities less than 25 percent by volume, less than 22 percent by volume, less than 20 percent by volume, or less than 18 percent by volume.

DETAILED DESCRIPTION OF THE INVENTION

Figure 1:
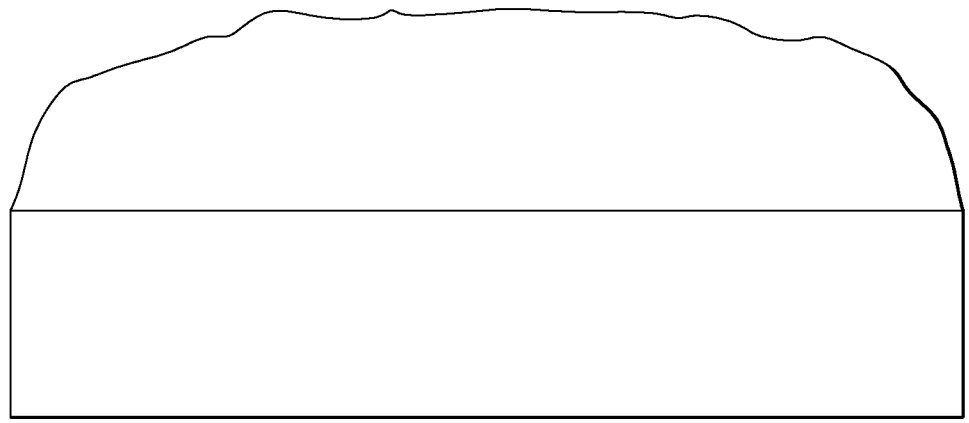
FIG. 1 is a photograph of a layer of inventive formulation A on a carbon brick after firing.

Vessels designed for containing molten metals are lined with a protective layer containing refractory aggregate. A blast furnace, which is a large vessel that is used to process iron ore into iron, is an example of such a vessel.

A formulation that contains refractory aggregate, cement, resin and polymer can be combined with water at the nozzle and can be applied to the interior of a vessel, a blast furnace for example, designed for containing molten metal. This formulation forms a protective layer in the lining of the vessel. Also, this inventive formulation could be used to repair a current protective lining.

This formulation, when combined with water, produces a gunning material (or gunite) that can be bonded to carbon brick that is within the blast furnace (BF) hearth. This gunite will be used to repair and protect the blast furnace hearth carbon brick. This gunite is the key component of a blast furnace hearth repair procedure because it can be applied in a single layer that is gunned directly onto the carbon brick. Also, it contains resin that may produce, depending on the resin used, thermal setting at a temperature of approximately 200° F. (93° C.).

When water dissolves the polymer of the inventive formulation, it creates a clear, highly viscous, and sticky mixture. This sticky mixture, when combined with the other components of the formulation, enables the formulation to adhere to the carbon bricks of the vessel lining to protect them. The polymer, along with the resin, provides elemental carbon to enable the formulation to covalently bond to the carbon brick. This chemical bond enables the formulation to protect the carbon brick from chemical and mechanical attack at the bottom of the vessel. The cement present in the formulation is a type of binder that sets by forming hydrated compounds when mixed with water, and is used to bind the aggregate components together.

The dry components of the inventive formulations may be combined in a mixer. Dry blending may be carried out for about 10 to 20 minutes in a Simpson mixture, and the blended formulation may be bagged in 50 pound (22.6 kilogram) bags. Bags of the blended formulation should be kept in a dry, moisture-free environment to prevent the formation of clumps from the reaction of water with the cement.

Vessels are cooled for application of inventive materials in the same manner that they were cooled for application of previously known materials. To apply repair material according to the invention, the vessel is cooled to about 70° F. (21° C.). Then, once the material is installed, the vessel is heated according to procedures used for the prior art material. Gradual or stepwise increases in temperature allow sufficient time for the free water and chemical water to escape without spelling the material off the carbon brick.

Example 1

In a comparison of the difference in properties obtained from the prior art formulation and the inventive formulation, two test materials were made with the same refractory aggregate.

Inventive formulation A contains 20.5 wt % Mulcoa® 60, 38.5 wt % tabular alumina, 12 wt % silicon carbide, 2 wt % water soluble polymer, 0.5 wt % Phenolic Novolac resin, 1.2 wt % titanium dioxide, 10 wt % alumina, 10 wt % calcium aluminate cement, 5 wt % silica fume and 0.3 wt % additives. Then 7.25 wt % of water is added to this combination to make it castable. The dry ingredients were mixed in a conventional refractory mixer. Resulting samples of cast material were subjected to modulus of rupture (MOR), cold crushing strength (CCS), bulk density, and percent apparent porosity after drying the material to 230° F. (110° C.).

The results in Table I are average values for three samples of inventive formulation A.

TABLE I

| Inventive Formulation A Dried at 230° F. (110° C.) for 24 h | | |
|---|---|---|
| MOR, psi | 2264 psi | 15600 kPa |
| CCS, psi | 7759 psi | 53500 kPa |
| Bulk Density, pcf | 153 pcf (lb/ft$^3$) | 2.45 g/cm$^3$ |
| % Apparent Porosity | | 16.3 |

Prior art formulation B contains 20.5 wt % Mulcoa® 60, 38 wt % tabular alumina, 12 wt % silicon carbide, 2 wt % silica sand, 2 wt % kyanite, 15 wt % alumina, 5 wt % calcium aluminate cement, 5 wt % Silica Fume, and 0.5 wt % additives. 5.8 wt % of water was then added to the mix to make it castable. These ingredients were mixed in a conventional refractory mixer. Resulting samples were subjected to modulus of rupture (MOR), cold crushing strength (CCS), bulk density, and percent apparent porosity after drying the material to 230° F. (110° C.). Results of these tests on a sample of prior art formulation B are shown in Table II.

TABLE II

| Prior Art Formulation B Dried at 230° F. (110° C.) for 24 h | | |
|---|---|---|
| MOR, psi | 1054 psi | 7270 kPa |
| CCS, psi | 4183 psi | 28800 kPa |
| Bulk Density, pcf | 163 pcf (lb/ft$^3$) | 2.61 g/cm$^3$ |
| % Apparent Porosity | | 15.1 |

Example II

Figure 2:
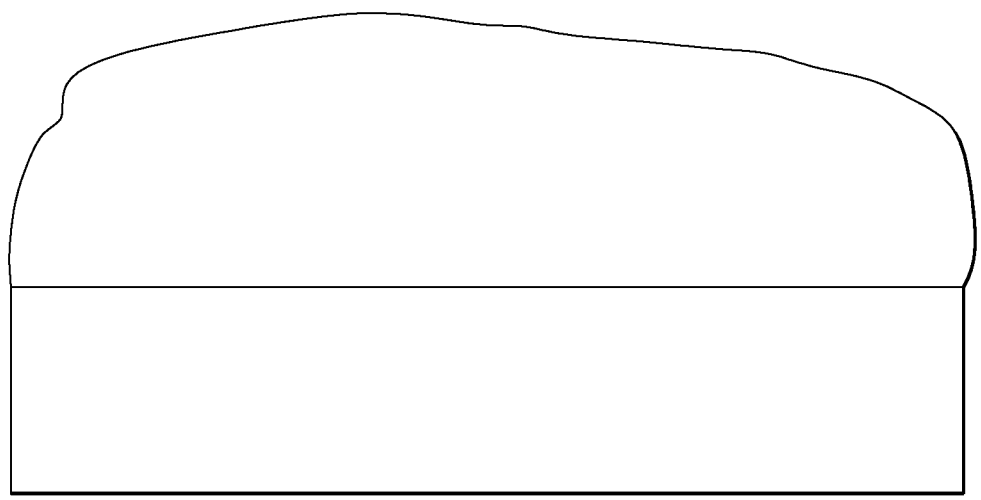
FIG. 2 is a photograph of a layer of prior art formulation B on a carbon brick after firing.

Testing was performed on samples of inventive formulation A and prior art formulation B to compare their abilities to adhere to carbon brick. Layers of inventive formulation A and prior art formulation approximately a half inch (12 mm) thick were placed on top of respective pieces of carbon brick. Both pieces of carbon brick, covered with the respective formulations, were fired in a reducing atmosphere at 2500° F. (1371° C.). FIG. 1 shows inventive formulation A on a carbon brick after firing. FIG. 2 shows prior art formulation B on a carbon brick after firing. Inventive formulation A adhered to the brick; prior art formulation B did not adhere; prior art formulation B could be pulled from the carbon brick by hand.

Example III

Testing was performed on samples of inventive formulation A and prior art formulation B to compare their abilities to withstand chemical erosion. In a blast furnace, chemical attack is the result of exposure to lead/iron, zinc/iron, and slag. A block of each material, measuring 2 inches by 2 inches (5 cm×5 cm), was prepared. A hole was drilled in the middle of each block to hold metal samples within the material.

Cup tests were performed on samples of inventive formulation A and prior art formulation B into which Zn/Fe was placed. The samples containing the Zn/Fe were exposed to a reduced atmosphere at 1400° F. (760° C.) for 5 hours. 1400° F. (760° C.) is slightly below the temperature at which Zn boils and becomes a vapor. The weight ratio of the Zn/Fe sample used was approximately 1 Zn:6 Fe.

Figure 3:
FIG. 3 is a photograph of a cross-section of a block of inventive formulation A after a Zn/Fe exposure cup test.
Figure 4:
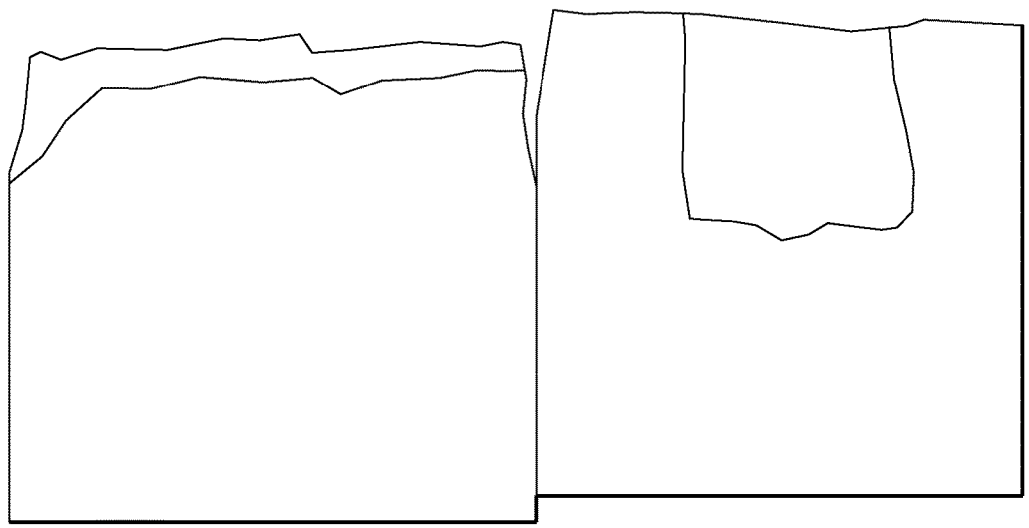
FIG. 4 is a photograph of a cross-section of a block of prior art formulation B after a Zn/Fe exposure cup test.

FIG. 3 shows a section of a block of the inventive formulation after testing. FIG. 4 shows a section of a block of the prior art formulation after testing. These pictures show no difference in the erosion of the inventive formulation sample and the prior art sample after the Zn/Fe exposure test.

Example IV

Blocks of inventive formulation A and prior art formulation B, each measuring 2 inches by 2 inches (5 cm×5 cm), were prepared. A hole was drilled in the middle of each block to hold metal samples within the material. Cup tests were performed on samples of inventive formulation A and prior art formulation B into which Pb/Fe was placed. The samples containing the Pb/Fe were exposed to a reduced atmosphere at 2500° F. (1400° C.) for 5 hours. 2500° F. (1400° C.) is slightly below the temperature at which Pb boils and becomes a vapor. The weight ratio of the Pb/Fe sample used was approximately 1 Pb:3.5 Fe.

Figure 5:
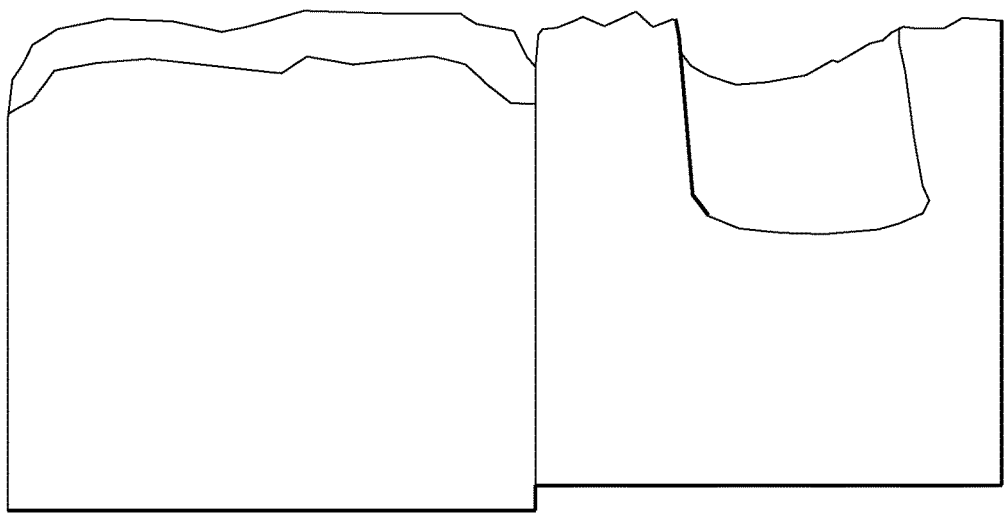
FIG. 5 is a photograph of a cross-section of a block of inventive formulation A after a Pb/Fe exposure cup test.
Figure 6:
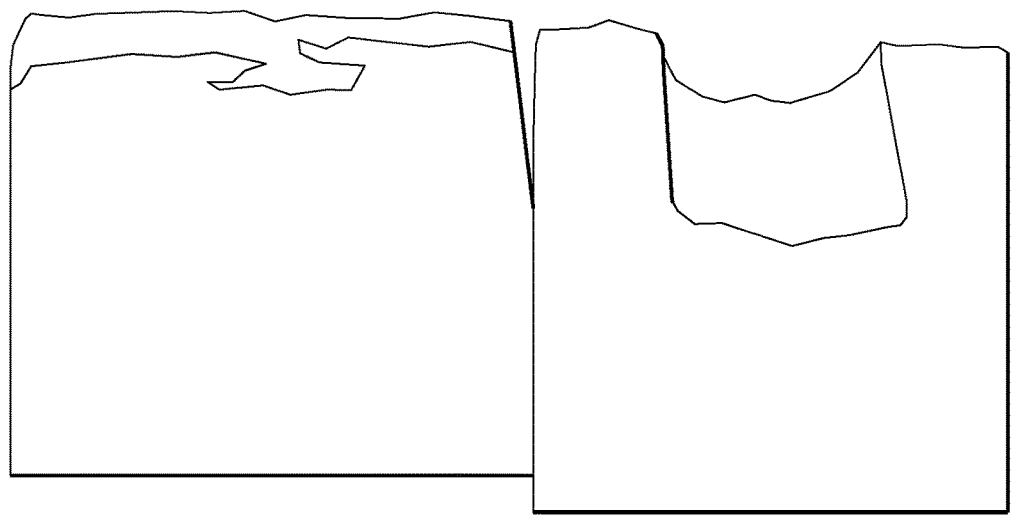
FIG. 6 is a photograph of a cross-section of a block of prior art formulation B after a Pb/Fe exposure cup test.

FIG. 5 shows a section of a block of the inventive formulation after testing. FIG. 6 shows a section of a block of the prior art formulation after testing. These pictures show no difference in the erosion of the inventive formulation sample and the prior art sample after the Pb/Fe exposure test.

Example V

Blocks of inventive formulation A and prior art formulation B, each measuring 2 inches by 2 inches (5 cm×5 cm), were prepared. A hole was drilled in the middle of each block to hold metal samples within the material. Cup tests were performed on samples of inventive formulation A and prior art formulation B with which 100% blast furnace slag C was used. The composition of samples of blast furnace slag C is provided in Table III. The samples containing the slag were exposed to a reduced atmosphere at 2800° F. (1540° C.) for 5 hours. Slag is molten at 2800° F. (1540° C.), and this is the temperature of the molten iron coming out of a blast furnace taphole.

TABLE III

Composition of Blast Furnace Slag C, Uniquant Semi-Quantitative Analysis

| Component | 2/2007 sample, wt % | 9/2009 sample, wt % | Average wt % |
|---|---|---|---|
| CaO | 39.1 | 33.58 | 36.34 |
| $SiO_2$ | 35.68 | 40.33 | 38.005 |
| MgO | 9.87 | 11.61 | 10.74 |
| $Al_2O_3$ | 11.43 | 11.08 | 11.255 |
| $SO_3$, S | 1.51 | 1.39 | 1.45 |
| $Fe_2O_3$ | 0.24 | 0.13 | 0.185 |
| $TiO_2$ | 1.09 | 0.53 | 0.81 |
| MnO | 0.25 | 0.3 | 0.275 |
| $K_2O$ | 0.29 | 0.38 | 0.335 |
| BaO | 0.08 | 0.16 | 0.12 |
| $Na_2O$ | 0.23 | 0.24 | 0.235 |
| SrO | | | |
| $ZrO_2$ | | | |
| Other ($WO_3$, light elements, etc.) | 0.15 | 0.09 | 0.12 |
| Total | 99.91 | 99.82 | 99.865 |
| (CaO + MgO)/$SiO_2$ | 1.37 | 1.12 | 1.245 |
| (CaO + MgO)/($Al_2O_3$ + $SiO_2$) | 1.04 | 0.88 | 0.96 |

Figure 7:
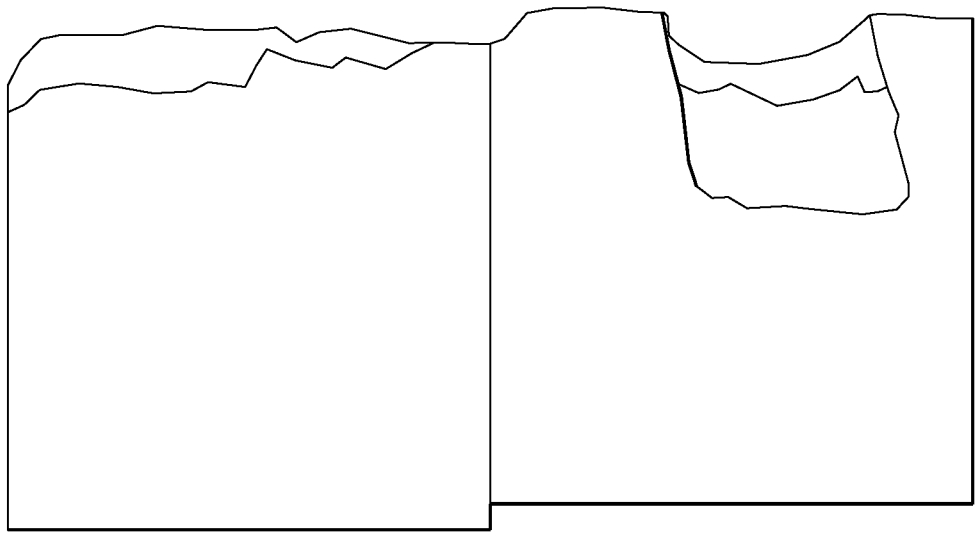
FIG. 7 is a photograph of a cross-section of a block of inventive formulation A after a blast furnace slag exposure cup test.
Figure 8:
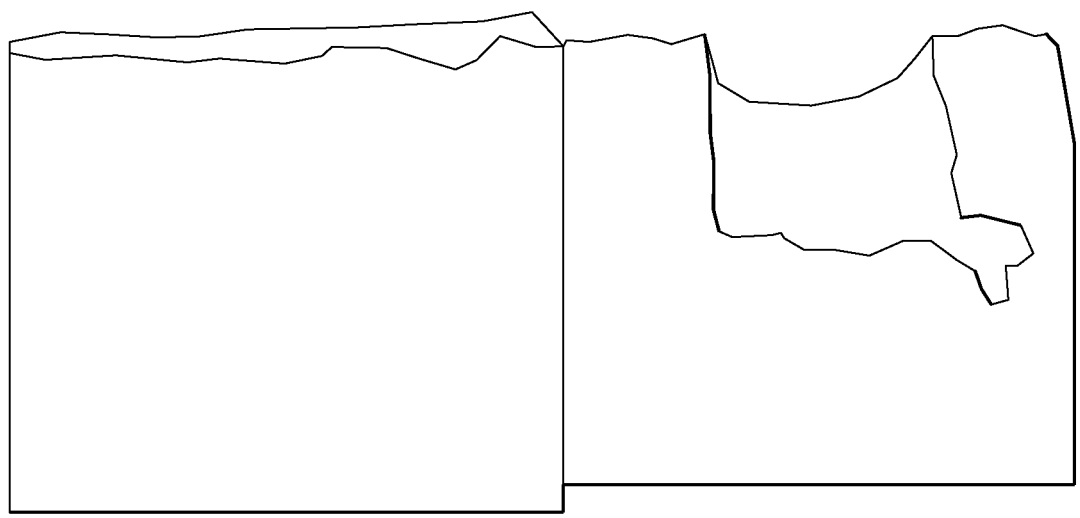
FIG. 8 is a photograph of a cross-section of a block of prior art formulation B after a blast furnace slag exposure cup test.

FIG. 7 shows a section of a block of the inventive formulation after testing. FIG. 8 shows a section of a block of the prior art formulation after testing. The drilled section of the inventive formulation block retained the blast furnace slag, whereas the block of prior art composition exhibited slag penetration extending nearly through the block from the cup to the exterior of the block.

Example VI

Physical properties of blocks cast from inventive formulation A were measured after exposure to 1500° F., 2000° F., 2500° F., and 2700° F., followed by cooling. Testing results are presented in Table IV.

TABLE IV

Physical Properties of Inventive Formulation "A"

| Linear Change, TP-151 (%): | | |
|---|---|---|
| 1500° F. (820° C.)/5 hrs | −0.32 | |
| 2000° F. (1100° C.)/5 hrs | −0.43 | |
| 2500° F. (1400° C.)/5 hrs | −0.52 | |
| 2700° F. (1500° C.)/5 hrs | −0.03 | |
| Cold MOR, TP-57 (psi and kPa) | | |
| 230° F. (110° C.)/16+ hrs | 2264 psi | 15600 kPa |
| 1500° F. (820° C.)/5 hrs | 943 psi | 6500 kPa |
| 2000° F. (1100° C.)/5 hrs | 1080 psi | 7450 kPa |
| 2500° F. (1400° C.)/5 hrs | 1317 psi | 9080 kPa |
| 2700° F. (1500° C.)/5 hrs | 2021 psi | 13900 kPa |
| Cold Crushing Strength, TP-57 (psi and kPa) | | |
| 230° F. (110° C.)/16+ hrs | 7759 psi | 53500 kPa |
| 1500° F. (820° C.)/5 hrs | 3649 psi | 25200 kPa |
| 2000° F. (1100° C.)/5 hrs | 5119 psi | 35300 kPa |
| 2500° F. (1400° C.)/5 hrs | 6319 psi | 43600 kPa |
| 2700° F. (1500° C.)/5 hrs | 6385 psi | 44000 kPa |
| Bulk Density, TP-56 (pcf and g/cm³) | | |
| 230° F. (110° C.)/16+ hrs | 153 pcf | 2.45 g/cm³ |
| 1500° F. (820° C.)/5 hrs | 145 pcf | 2.32 g/cm³ |
| 2000° F. (1100° C.)/5 hrs | 146 pcf | 2.34 g/cm³ |
| 2500° F. (1400° C.)/5 hrs | 150 pcf | 2.40 g/cm³ |
| 2700° F. (1500° C.)/5 hrs | 149 pcf | 2.39 g/cm³ |
| Apparent Porosity, TP-56 (%) | | |
| 230° F. (110° C.)/16+ hrs | 16.3 | |
| 1500° F. (820° C.)/5 hrs | 29.2 | |
| 2000° F. (1100° C.)/5 hrs | 28.4 | |
| 2500° F. (1400° C.)/5 hrs | 24.3 | |
| 2700° F. (1500° C.)/5 hrs | 22.6 | |
| Hot MOR, ASTM C-583 (psi and kPa) | | |
| @ 1500° F. (820° C.) | 1567 psi | 10800 kPa |
| @ 2000° F. (1100° C.) | 1564 psi | 10800 kPa |
| @ 2500° F. (1400° C.) | 401 psi | 2760 kPa |
| @ 2700° F. (1500° C.) | 120 psi | 830 kPa |

Example VII

An alkali cup test was performed on samples of the inventive formulation to determine alkali resistance. Three cup samples of the inventive formulation were placed in an oxidizing atmosphere, and three samples of the inventive formulation were placed into a sagger coke box having a reducing atmosphere. Four grams of salt were placed into each of the cups. Samples A2 contained $Na_2CO_3$, samples B2 contained $K_2CO_3$, and samples C2 had a 50:50 mixture of the two. The cup samples were slowly ramped (300° F. (149° C.)/hour) to 2500° F. (1371° C.) and kept at 2500° F. (1371° C.) for 5 hours. Table V shows the data for the cubes placed into an oxidizing atmosphere and Table VI shows the data for the cubes placed into a reducing atmosphere.

TABLE V

Alkali Cup Test of Samples in Oxidizing Atmosphere

| A2 | B2 | C2 |
|---|---|---|
| Good/Excellent | Fair to Poor | Fair |
| Contained Salt | No Salt | No Salt |
| No Cracking | Large Crack | Open Crack |
| No Distortion (Swelling) | Distortion | No Distortion |

TABLE VI

Alkali Cup Test of Samples in Reducing Atmosphere

| A3 | B3 | C3 |
|---|---|---|
| Good | Fair | Good |
| No Salt | No Salt | No Salt |
| No Cracking | Open Crack | No Cracking |
| No Swelling | No Swelling | No Swelling |

Example VIII

A thermal shock test was performed on blocks formed from gunned inventive formulation. Ten cubes were cut out of gunned panels of the inventive formulation that were already dried at 230° F. (110° C.) for 24 hours. Then the 10 cubes were fired to 2000° F. (1093° C.) for 5 hours before beginning the thermal cycling test. The thermal cycling was performed at 2000° F. (1093° C.). A set of 5 cubes at 77° F. (25° C.) were placed into a furnace at 2000° F. (1093° C.) for 30 minutes. Then the specimens were immediately placed in a container filled with flowing cool water in order to shock the samples. They were left in water for 5 minutes, and then cooled at room temperature onto an alumina setter for 30 minutes with a fan blowing air over them. Finally, each of the samples was inspected for fractures. This process was repeated for 10 cycles. The results for the test are shown in Table VII. The ratings for the cubes are reported on a scale from 0 to 5, in which 0 represents no cracks, 1 represents mild cracking, 2 represents moderate cracking, 3 represents heavy cracking, 4 represents severe cracking, and 5 represents a piece of the cube completely breaking off. Ratings are reported for the condition of the cube after cycle 10 (on a scale of 0 to 5), and as a sum of the ratings after each of cycles 1 through 10 (on a scale of 0 to 50).

TABLE VII

Thermal Shock Test Results for Samples of Inventive Formulation "A"

| | Cube A4 | Cube B4 | Cube C4 | Cube D4 | Cube E4 | Cube F4 | Cube G4 | Cube H4 | Cube J4 | Cube K4 |
|---|---|---|---|---|---|---|---|---|---|---|
| After cycle 10 | 4 | 4 | 3 | 3 | 4 | 4 | 3 | 3 | 3 | 3 |
| Sum of 10 cycles | 23 | 25 | 15 | 18 | 26 | 28 | 21 | 21 | 17 | 21 |

Example IX

Figure 9:
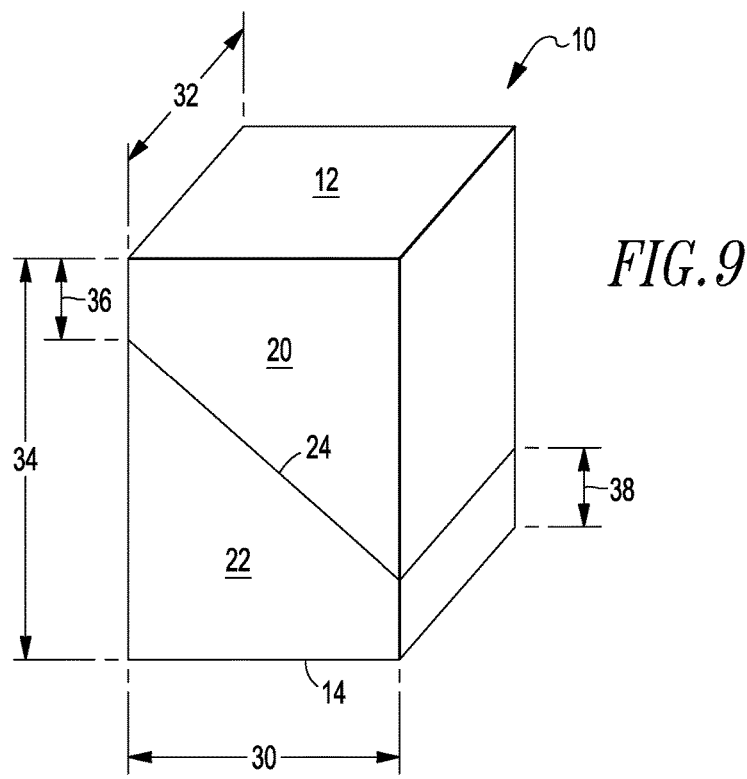
FIG. 9 is a perspective drawing of the components of a slant shear test block.

A slant shear test was performed on block assemblies formed from carbon brick (which is the same type that is used inside a blast furnace hearth), inventive formulation, and a combination of gunned inventive composition onto carbon brick. FIG. 9 shows a testing block assembly 10 having a top 12, a bottom 14, and an upper portion 20 in contact with a lower portion 22 along a contact plane 24 inclined with respect to the horizontal. Testing block assembly has a length 30, a width 32 and a height 34. Upper portion minimum facial height 36 represents the minimum facial distance on upper portion 20 between the contact plane 24 and the top 12. Lower portion minimum facial height 38 represents the minimum facial distance on lower portion 22 between the contact plane 24 and the bottom 14. Dimensions used for sample testing are: 2.5 inches or 63.5 mm for length 30, 2 inches or 50.8 mm for width 32, 3 inches or 76.2 mm for height 34, 0.5 inch or 12.7 mm for upper portion minimum facial height 36 and 0.5 inches or 12.7 mm for lower portion minimum facial height 38. The angle of inclination of contact plane 24 with the horizontal is 39°.

The following procedure was used to perform the analysis:
1. Dry the carbon brick/Inventive formulation material for 24 hours at 230° F. (110° C.)
2. Cut the carbon brick, inventive formulation, and the carbon brick with the gunned inventive formulation in a way to form the cube design of FIG. 9.
3. Coke the cubes in a saggar coke box at 2000° F. (1093° C.) for 5 hours with a ramp rate of 300° F. (149° C.) per hour
4. Perform the cold crushing strength test on each cubes, photograph each cube, and record pressure to crush
5. Crush the cubes at a constant rate of 7000 lbs (3200 kg)/minute.

Table VIII contains results for the cold crushing of each sample and an average.

TABLE VIII

Slant Shear Test Data

| Carbon Brick | | |
|---|---|---|
| Sample A5 | 5762 psi | 39700 kPa |
| Sample B5 | 5963 psi | 41100 kPa |
| Sample C5 | 5712 psi | 39400 kPa |
| Average | 5812 psi | 40100 kPa |
| Inventive Formulation A | | |
| Sample A6 | 2958 psi | 20400 kPa |
| Sample B6 | 2976 psi | 20500 kPa |
| Sample C6 | 3224 psi | 22200 kPa |
| Average | 3053 psi | 21000 kPa |
| Mix Shear (Inventive Formulation on Carbon Brick) | | |
| Sample A7 | 2954 psi | 20400 kPa |
| Sample B7 | 4268 psi | 29400 kPa |
| Sample C7 | 4050 psi | 27900 kPa |
| Average | 3757 psi | 25900 kPa |

Figure 10:
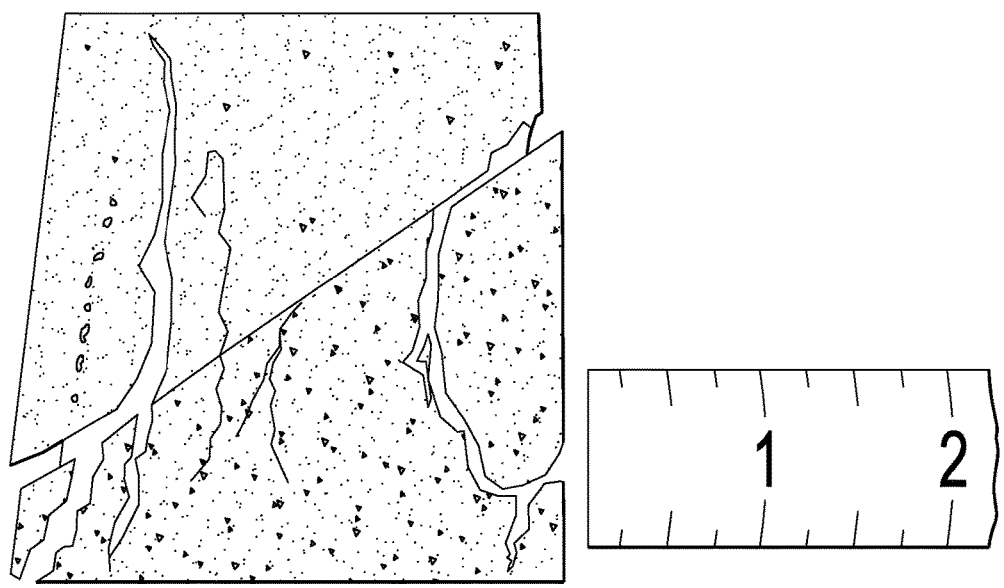
FIG. 10 is a line drawing of a photograph of a slant shear test block.

FIG. 10 shows the mix shear sample C7 after it has been crushed. The carbon brick is on top of the inventive formulation material.

Numerous modifications and variations of the present invention are possible. It is, therefore, to be understood that within the scope of the following claims, the invention may be practiced otherwise than as specifically described.

I claim:
1. A dry refractory composition, comprising:
    5 wt % to 97 wt % of an aggregate comprising a material selected from the group consisting of calcined flint clay, calcined kaolin, calcined bauxitic kaolin, andalusite, tabular alumina, silicon carbide, silicon nitride, calcined alumina, reactive alumina, hydrated alumina, silica fume, white fused alumina, brown fused alumina, calcined bauxite, silica sand, silica, clay, kyanite, spinel, fused silica, zircon, zirconia, and combinations of each thereof;
    0.01 wt % to 32 wt % of a water-soluble polymer selected from the group consisting of cellulose, dextran, poly(N-vinylpyridine), poly(acrylamide/acrylic acid), poly(acrylic acid), poly(ethylene glycol), poly(ethylene oxide), poly(N-vinylpyrrolidone), poly(vinyl alcohol), polyacrylamide, polyethyleneimine and combinations of each thereof;
    0.01 wt % to 32 wt % of a resin selected from the group consisting of phenolic novolac resin, phenolic resole resin, epoxy resin, polyester resin, polyurethane resin, acrylic resin and combinations of each thereof; and
    0.01 wt % to 15 wt % of a cement comprising a material selected from the group consisting of silicon dioxide, aluminum oxide, iron (III) oxide, calcium oxide and combinations of each thereof.

2. The refractory composition of claim 1, wherein the aggregate comprises a material selected from the group consisting of calcined bauxitic kaolin, andalusite, tabular alumina, silicon carbide, silicon nitride, calcined alumina, reactive alumina, hydrated alumina, silica fume, white fused alumina, brown fused alumina, calcined bauxite, and combinations thereof.

3. The refractory composition of claim 1, wherein the water-soluble polymer comprises poly(N-vinylpyrrolidone).

4. The refractory composition of claim 1, wherein the cement comprises calcium aluminate cement.

5. The refractory composition of claim 1, wherein the cement comprises a material selected from the group consisting of Portland cement, blast furnace cement, flue ash Portland cement, ciment composé, puzzolane cement, high alumina cement, Brunauer cement, Grenoble cement, Roman cement, and combinations thereof.

6. The refractory composition of claim 1, wherein the aggregate is present in an amount from and including 40 wt % to and including 90 wt % of the dry refractory composition.

7. The refractory composition of claim 1, wherein the cement is present in an amount from and including 0.01 wt % to and including 15 wt % of the dry refractory composition.

8. The refractory composition of claim 1, further comprising a dispersant.

9. The refractory composition of claim 8, wherein the dispersant is selected from the group consisting of sodium phosphates, naphthalene sulfonate salts, and sodium lignosulfates.

10. The refractory composition of claim 1, further comprising a dry powder accelerator.

11. The refractory composition of claim 10, wherein the dry powder accelerator is a material selected from the group consisting of hydrated lime, magnesium hydroxide, and lithium-containing compounds.

12. The refractory composition of claim 1, further comprising polymer fibers.

13. The refractory composition of claim 12, wherein the polymer fibers are comprised of a material selected from the group consisting of polyolefin, polyethylene, polypropylene, a combination of polyethylene and polypropylene, and combinations of these materials.

14. The refractory composition of claim 1, wherein the resin is selected from the group consisting of phenolic novolac resin, phenolic resole resin, epoxy resin, acrylic resin and combinations thereof.

15. The refractory composition of claim 14, wherein the resin comprises phenolic novolac resin.

16. The refractory composition of claim 15, further comprising hydrated lime and sodium phosphate.

17. The refractory composition of claim 16, further comprising a component selected from the group consisting of aluminum, silicon, ferrosilicon, ferrosilicon nitride, titanium dioxide, and combinations of each thereof.

* * * * *